Oct. 28, 1952  W. H. CUTTINO  2,615,962
AUTOMATIC SWITCHING SYSTEM
Filed July 22, 1950
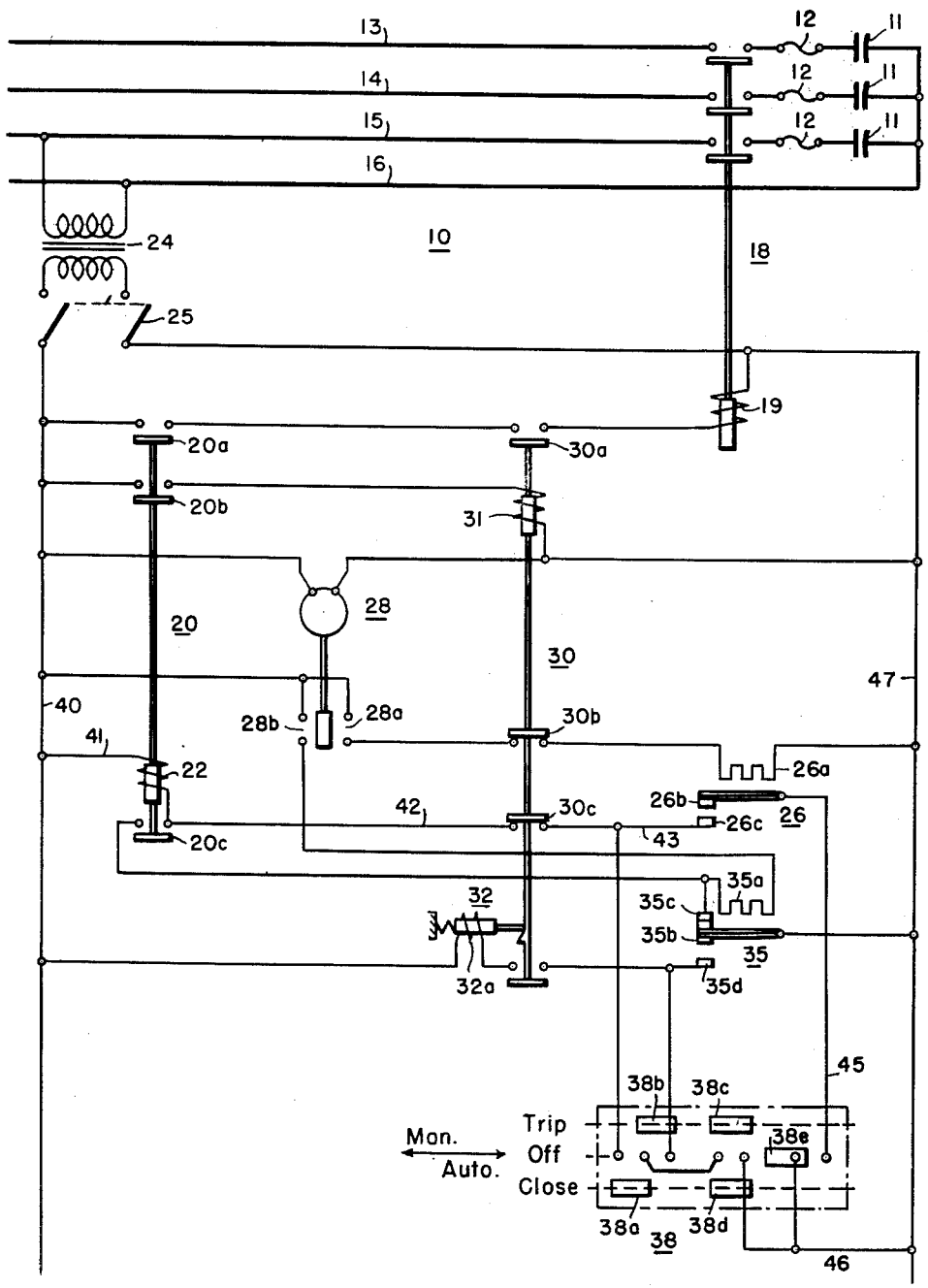
WITNESSES:
E. A. McCloskey
F. V. Giolma
INVENTOR
William H. Cuttino.
BY
Geo. D. Crawford
ATTORNEY Patented Oct. 28, 1952

2,615,962

UNITED STATES PATENT OFFICE 2,615,962

AUTOMATIC SWITCHING SYSTEM

William H. Cuttino, Wilkinsburg, Pa., assignor to Westinghouse Electric Corporation, East Pittsburgh, Pa., a corporation of Pennsylvania Application July 22, 1950, Serial No. 175,367

6 Claims. (Cl. 175—294)

My invention relates, generally, to switching systems, and it has reference, in particular, to automatic switching systems, such as may be used to control the connections of capacitors, or the like, to a power system.

Generally stated, it is an object of my invention to provide a switching system for capacitors that is simple and inexpensive to manufacture, and is reliable and effective in operation.

More specifically, it is an object of my invention to provide, in a switching system for capacitors, for using a contactor device for controlling the connections of the capacitors to a power circuit and using fuses to provide the necessary fault protection.

Another object of my invention is to provide, in a capacitor switching system, for using a contactor with a latch type control relay which must be reset after the contactor is closed to set up a closing circuit for subsequently reclosing the contactor, so as to prevent reclosing in the event the contactor opens due to a loss of voltage.

It is an important object of my invention to provide, in a switching system for capacitors, for preventing pumping of an oil switch contactor used for controlling the connections of the capacitors to a power circuit.

Yet another object of my invention is to provide, in a capacitor switching system, for utilizing a simple oil switch contactor and a voltage responsive control panel for controlling the connection of the capacitor to a power circuit.

It is an important object of my invention to provide a simple and inexpensive control system for controlling the operation of a contactor device connecting capacitors to a power circuit.

Other objects will in part be obvious, and will in part be explained hereinafter.

In practicing my invention according to one of its embodiments, an oil switch contactor is utilized to effect connection of capacitors to a power circuit in response to operation of a voltage relay connected to the power circuit. A latch type control relay is used to provide an operating circuit for a closing relay and complete the operating circuit for the contactor, and is operated each time the contactor closes, so that it must be reset in order to subsequently reclose the contactor. The voltage relay resets the control relay a predetermined time after the voltage of the circuit has dropped below a predetermined value, so that the control relay prevents reclosing of the contactor in the event that it opens due to a loss of voltage as a result of a capacitor fault.

For a more complete understanding of the nature and scope of my invention, reference may be made to the following detailed description, which may be read in connection with the accompanying drawing, in which the single figure is a diagrammatic view of a capacitor switching system embodying the invention in one of its forms.

Referring to the drawing, the reference numeral 10 may denote, generally, an automatic switching system for controlling the connection of banks of capacitor units represented by capacitors 11 through fuses 12 individual to each bank, to the conductors 13 through 16 of a power circuit, which may be connected to a suitable source of alternating current.

The capacitors 11 may be connected to the conductors 13, 14 and 15 by means of an oil switch contactor 18 having an operating winding 19 which must be energized to effect operation of the switch, and which must be maintained in an energized condition to maintain the switch closed. A closing relay 20 having an operating winding 22 may be utilized to connect the operating winding 19 of the switch 18 to a suitable source of control voltage, which may be supplied from a control transformer 24 connected to the conductors 15 and 16.

Operation of the closing relay 20 may be effected by means of a closing time delay relay 26 under the control of a voltage relay 28, which may be energized from the control transformer 24, so as to operate and engage stationary contact members 28a or 28b, to "raise" and "lower" positions in response to decreases and increases of voltage in the circuit. The time delay relay 26 may, for example, be of the thermal bimetal type, comprising a heater element 26a disposed to be connected to the source by the voltage relay 28, and a bimetallic contact member 26b disposed to be actuated into engagement with a stationary contact member 26c for effecting energization of the operating winding 22 of the closing relay 20.

In order to prevent repeated reclosing or pumping of the contactor switch 18 in the event that it opens due to a loss of voltage resulting, for example, from a fault on one of the capacitor units, before the primary fuse 12 for the particular bank can clear the circuit, a control relay 30 having an operating winding 31, may be utilized. The control relay 30 may be disposed to complete the energizing circuit for the operating winding 19 of the switch 18 and interrupt the energizing circuit of the closing relay 20, so as to prevent reclosing of the breaker. The operating winding 31 may, for example, be energized through contact member 20b of the closing relay 20. The control relay 30 may be of the latch type, being, for example, provided with a latch mechanism 32 for latching the relay in the operating position.

A reset winding 32a may be provided in conjunction with the latch mechanism 32 for releasing the latch mechanism to restore the control relay to a normal or non-operated position. Reset of the control relay 30 may be normally effected by connecting the reset winding 32a to the control source through a trip time delay relay 35 which may be of the thermal bimetallic device comprising a heater element 35a and a bimetallic contact member 35b disposed to normally engage a stationary contact member 35c and operable to engage a normally opened contact member 35d.

In order to provide selective control of the contactor switch 18, a control switch 38 may be provided which may be selectively operable to an "automatic" position for connecting the operating winding 22 of the closing relay and the reset winding 32a of the latch mechanism for energization under the control of the voltage relay 28, or to a manual position for effecting direct connection of the winding of the closing relay 20 to the control source.

With the system in the deenergized position as shown, the control switch 38 may be operated to the right, to the "automatic" position, and the control switch 25 may be closed to connect the control circuits to the control transformer 24. If the voltage relay 28 happens to be operated to the right-hand or "raise" operating position in response to a reduction of the voltage of the power circuit, an obvious energizing circuit will be provided for the heater 26a of the closing time delay relay 26 through contact members 28a and 30b. After a predetermined interval of time, contact member 26b engages contact member 26c, and an energizing circuit is provided for the operating winding 22 of the closing relay 20, extending from the left-hand control conductor 40 through conductor 41, operating winding 22, conductor 42, contact member 30c of the control relay 30, conductor 43, contact member 26c, contact member 26b, conductor 45, contact member 38e, and conductor 46 to the left-hand control conductor 47.

The closing relay 20 thereupon operates, setting up an energizing circuit for the operating winding 19 of the switch 18 through contact member 20a, and providing a holding circuit for itself through contact member 20c and normally closed contact members 35c and 35b of the trip time delay relay 35. At the same time an obvious energizing circuit is provided for the operating winding 31 of the control relay 30 through contact member 20b. The control relay 30 operates, and the latch mechanism 32 latches it in the operated position. The energizing circuit for the heater 26a of the closing time delay relay 26 is interrupted at contact member 30b so as to prevent continuous energization of the heating element in the event the contactor 18 should open without the control relay 30 being reset, which condition may occur in the event of a loss of voltage.

Operation of the control relay 30 to the energized position also interrupts the initial energizing circuit for the operating winding 22 of the closing relay 20 at contact member 30c. Thus, should the contactor 18 open due to a loss of voltage or a collapse of voltage due to a fault, which condition may readily occur before failure of one of the capacitor units comprising one of the banks 11 operates the primary line fuse 12 of the bank, the closing relay 22 cannot be reclosed even though the bimetallic contact member 26b of the closing time delay relay 26 remains in contact with the stationary contact member 26c for a predetermined time. The control relay 30 must be reset to complete the energizing circuit for the operating winding 22 of the closing relay 20 at contact member 30c.

Reset of the control relay 30 can only be effected through energization of the reset winding 32a as a result of operation of the trip time delay relay 35 in response to operation of the voltage relay 28 to the left-hand or "lower" operating position. This condition will not be attained when there is a loss of voltage caused by closing on a fault, since the loss of voltage will not be of sufficient duration, and when the contactor switch 18 opens, the closing relay 20 is deenergized at the same time and must remain deenergized as its energizing circuit is interrupted at contact member 30c, since the control relay 30 remains latched in the operated position.

Should the voltage of the power system exceed the predetermined value for which the voltage relay 28 is calibrated, while the capacitors are connected to the power circuit, an obvious energizing circuit is provided for the heater element 35a, and after a predetermined interval of time contact member 35b engages the stationary contact member 35d, providing an obvious energizing circuit for the reset winding 32a of the latch mechanism and interrupting the holding circuit of the closing relay 20 at contact member 35c. The control relay 30 is released and is restored to its normal or non-operated position, interrupting the energizing circuit for the operating winding 19 of the contactor 18 at contact member 30a. Contact member 30b closes to set up an energizing circuit for the heater 26a of the closing time delay relay 26. Contact member 30c sets up the energizing circuit for the operating winding 22 of the closing relay 20, so that the system is reset for retaking the capacitors 12 to the power circuit in response to subsequent operation of the voltage relay 28.

Manual operation of the contactor switch 18 may be effected by operating the control switch 38 to the left-hand or "manual" position and then moving it to either the "close" or "trip" position to set up obvious energizing circuits for the operating winding 22 of the closing relay 20 and the trip winding 32a of the latch mechanism 32 through contact members 38a and 38d, or 38b and 38c, respectively.

From the above description and accompanying drawing, it will be found that I have provided a simple and inexpensive switching system for switching small capacitors where the fault protection is provided by means of main or primary fuses for each bank of capacitor units which are usually of such capacity that a fault on a single section or unit of one of the capacitor banks will usually result in opening of the contactor due to loss of voltage, particularly where the capacitors are at the end of a long line, before the primary fuse operates to clear the fault. By utilizing a latch type control relay which must be reset in response to operation of the voltage relay before the contactor may be reclosed, repetitive closing of the contactor on a fault may be prevented. A control system embodying the features of my invention comprises a minimum amount of equipment and a minimum of expense. It is, therefore, highly adaptable to numerous capacitor installations which have heretofore been permanently connected and which it is desired to change over to an automatic switching system.

Since certain changes may be made in the above-described construction, and different embodiments of the invention may be made without departing from the spirit and scope thereof, it is intended that all the matter contained in the above description and shown in the accompanying drawing shall be considered illustrative and not in a limiting sense.

I claim as my invention:

1. The combination with a contactor type switch operable to connect a load device to a power circuit, of a voltage relay responsive to the voltage of the circuit, means including a control relay operable to complete an operating circuit for the switch, means releasably retaining the control relay in the operating position, a closing relay, circuit means including contacts of the closing relay connected to set up said operating circuit for said switch and effect operation of the control relay to complete said operating circuit, and a circuit including a movable contact operable in accordance with the voltage responsive relay and a normally closed contact of the control relay connected to effect operation of the closing relay.

2. The combination with a switch device having an operating winding disposed to be energized to maintain the switch closed and connect an electrical device to a power circuit, of means including a closing relay connected to set up an energizing circuit for said operating winding, a control relay, an operating circuit for the closing relay including a normally closed contact of the control relay, said control relay having a contact connected in series with the operating winding of the switch operable to an operating position in response to operation of the closing relay to complete the operating circuit for the switch, a latch releasably retaining the control relay in the operating position, and means including a relay operable in response to the voltage of the power circuit to complete the operating circuit for the closing relay.

3. In a switching system, a switch device having an operating winding to effect operation of the switch device to connect an electrical device to a power circuit, a closing relay having contact means connected in series circuit with said winding to set up an energizing circuit for said operating winding, means including a control relay of the latch type operable in response to operation of the closing relay to complete the energizing circuit for the operating winding of the switch device, said control relay having a latch releasably retaining it in the operated position and having normally closed contacts which open when the control relay so operates, a circuit including contact means actuated in response to a reduction in the voltage of the power circuit and said normally closed contact means connected to provide an operating circuit for the closing relay, and an additional circuit including a contact actuated in response to an increase in the voltage of the power circuit connected to provide a reset circuit for effecting operation of said releasable latch to release the control relay from the operated position.

4. A switching system comprising, a switch device operable to make a connection to a power circuit, said switch device having an operating winding, means including a closing relay operable to set up an energizing circuit for the switch device and provide a holding circuit for itself, a control relay of the latched-in operating position type, a circuit including contacts of the control relay connected to complete said energizing circuit, said control relay having a reset winding disposed to release the relay to a normal non-operated position when energized, a voltage relay responsive to the voltage of the power circuit, a circuit including time delay means operable in response to operation of the voltage relay when the voltage increases above a predetermined value to connect the reset winding for energization, another circuit including additional time delay means operable in response to a reduction in the voltage below a predetermined value to connect an operating circuit for the closing relay, and normally closed contact means of the control relay connected in series with said operating circuit to render the additional time delay means ineffective unless the control relay is reset.

5. A switching system comprising, a switch device having an operating winding disposed to be energized to close the device and hold it closed to make a connection to a power circuit, means including a closing relay operable to set up an energizing circuit for said operating winding, a control relay of the latch type having an operating winding and a reset winding, a circuit connecting the operating winding of the control relay to be energized to effect operation of the closing relay to complete said energizing circuit, another circuit connecting the said reset winding disposed to be energized to reset the control relay to a non-operated position, means including a voltage control relay operable in response to voltage conditions of the power circuit to selectively energize the closing relay and the reset winding, and means including a manual switch selectively operable to different positions to set up energizing circuits for the closing relay and the reset winding either directly or through the voltage control means.

6. In a switching system, a switch having an operating winding disposed when energized to close the switch and make a connection to a power circuit, means including a closing relay operable to set up an energizing circuit for the operating winding, circuit means including a control relay operable in response to operation of the closing relay to complete the energizing circuit for said operating winding, said control relay being of the latched-in-operating position type and having a reset winding disposed when energized to release it to a normal position, a voltage relay having a contact member actuated in response to the voltage of the power circuit, time delay closing and tripping relays, circuits connecting said time delay relays to be selectively responsive to operation of the voltage relay, a circuit including a normally closed contact of the control relay connected in series circuit relation with the time delay closing means to render it inoperative except when the control relay is reset, another circuit including a contact operable in response to operation of the time delay tripping means connected to energize the reset winding of the control relay, and an additional circuit including a normally closed contact of the control relay connected in circuit relation with contact means of the time delay closing means and the closing relay to prevent reclosing the switch unless the control relay is reset.

WILLIAM H. CUTTINO.

REFERENCES CITED

The following references are of record in the file of this patent:

UNITED STATES PATENTS

| Number | Name | Date |
|---|---|---|
| 1,780,664 | Anderson | Nov. 4, 1930 |
| 1,780,676 | Hough | Nov. 4, 1930 |
| 2,388,639 | Marbury | Nov. 6, 1945 |